United States Patent [19]
Furkert

[11] 3,944,657
[45]* Mar. 16, 1976

[54] SULFUR DIOXIDE FROM BY-PRODUCT AMMONIUM SULFATE SOLUTIONS

[75] Inventor: Herbert Furkert, Grosskonigsdorf, Germany

[73] Assignee: Davy Powergas GmbH, Cologne-Braunsfeld, Germany

[ * ] Notice: The portion of the term of this patent subsequent to Mar. 5, 1991, has been disclaimed.

[22] Filed: Jan. 15, 1973

[21] Appl. No.: 323,895

Related U.S. Application Data

[63] Continuation-in-part of Ser. No. 228,258, Feb. 22, 1975, Pat. No. 3,795,731.

[30] Foreign Application Priority Data

Jan. 14, 1972 Germany............................ 2201632
Feb. 19, 1971 Germany............................ 2107910

[52] U.S. Cl........................... 423/541 A; 423/539
[51] Int. Cl.²................ C01B 17/60; C01B 17/50
[58] Field of Search.......... 423/539, 541, 542, 540, 423/242; 159/48 L; 23/275

[56] References Cited
UNITED STATES PATENTS

| | | | |
|---|---|---|---|
| 2,452,517 | 10/1948 | Broughton | 423/542 |
| 2,862,789 | 12/1958 | Burgress | 423/550 |
| 2,936,215 | 5/1960 | Hochmuth | 423/207 |
| 3,047,362 | 7/1962 | Smith | 423/207 |
| 3,359,069 | 12/1967 | Furkert et al. | 423/540 |
| 3,439,724 | 4/1969 | Mason | 423/207 |
| 3,645,683 | 2/1972 | Isbell, Jr. | 423/540 |

FOREIGN PATENTS OR APPLICATIONS 709,640 1/1954 United Kingdom.................. 423/542

OTHER PUBLICATIONS

Olsen, John C., Unit Processes and Principles of Chemical Engineering, D. Van Nostrand Co., Inc. NY 1932 pp. 1–3.

Primary Examiner—Oscar R. Vertiz
Assistant Examiner—Gary P. Straub
Attorney, Agent, or Firm—Millen, Raptes & White

[57] ABSTRACT

In a process of concentrating an aqueous solution of ammonium sulfate and burning resultant concentrate at 850°–1250°C to form a combustion gas containing $SO_2$, the improvement which comprises:

conducting said concentrating by passing said combustion gas in direct contact with said aqueous solution of ammonium sulfate to evaporate water from said solution. If the concentrate is a slurry, it can be sent in total to the combustion step or it can be centrifuged with a recycle of mother liquor to the concentrating step. The evaporation can also be conducted so that substantially dry ammonium sulfate is obtained.

8 Claims, 1 Drawing Figure

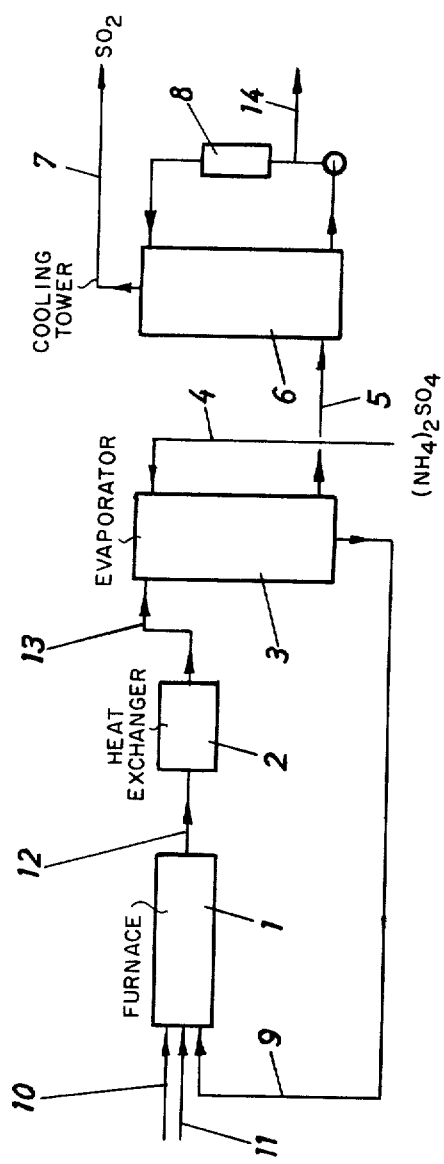

SULFUR DIOXIDE FROM BY-PRODUCT AMMONIUM SULFATE SOLUTIONS

CROSS REFERENCE TO RELATED APPLICATION

This application is a continuation-in-part of copending, commonly assigned U.S. Patent Application Ser. No. 228,258 filed Feb. 22, 1972, now U.S. Pat. No. 3,795,731.

BACKGROUND OF THE INVENTION

This invention relates to a process for the production of a gas containing sulfur dioxide from an aqueous ammonium sulfate solution obtained as a by-product, in particular, during the synthesis or organic compounds, such as caprolactam, for example.

The synthesis of several organic compounds, especially that of ε-caprolactam by way of cyclohexanone oxime, necessarily yields large amounts of ammonium sulfate, the precise amount of which is dependent on the method, for example, approximately 1 to 4 tons per ton of caprolactam. This ammonium sulfate is of very little economic value in the production of these organic compounds, since ammonium sulfate can be utilized only to a limited extent. A direct use as a fertilizer is impossible, because the impurities contained in this product result in a poorly crystallized, discolored ammonium sulfate. To attempt to upgrade the value of the ammonium sulfate, it is known to subject the ammonium sulfate solution obtained during the production of caprolactam, prior to crystallization, to a thermal pressure treatment, in order to produce a fertilizer (DAS [German Published Application] 1,284,954), or to treat this ammonium sulfate solution with aluminum sulfate and the sodium salt to ethylenediaminetetraacetic acid (Italian Patent No. 678,180). Ammonium sulfate solutions rich in organic components, obtained in the caprolactam production, can be evaporated and thereby separated from the organic components and can then be caused to crystallize, in accordance with Dutch Patent Applications 65 16058 and 65 16059. All of these measures, though increasing the quality of the thus-produced ammonium sulfate, are nevertheless relatively futile from a realistic marketing viewpoint because the use of high grade sulfate as a fertilizer is presently possible only to a very limited degree.

It is furthermore known from DOS [German Unexamined Published Application] 1,916,149 to neutralize the mixture obtained during the rearrangement of cyclohexanone oxime with sulfuric acid with the use of a metallic oxide in place of ammonia; to reductively split the thus-formed metallic sulfates to the metallic oxides and sulfur dioxide; to re-use the metallic oxide for the neutralization; and to process the sulfur dioxide into sulfuric acid, which latter is again utilized in the rearrangement process. The method has the disadvantage that the neutralization with metallic oxides takes place more slowly than with the use of ammonia, and that the universally employed neutralization with ammonia must be abandoned.

Finally, it has been suggested in U.S. Pat. No. 3,795,731 to combust solid, finely divided ammonium sulfate at temperatures of between 800° and 1250° C. to sulfur dioxide, steam, and nitrogen, and to maintain in the gases exiting from the combustion chamber, an oxygen concentration of between 1% and 10% by volume. In order to obtain the solid ammonium sulfate for the combustion, the salt must be crystallized out of the primarily obtained ammonium sulfate solution. This crystallization is generally conducted in an expensive, three-stage crystallizer and requires considerable expenses due to steam consumption and maintenance of a vacuum.

This invention is based on the problem of simplifying the recovery of the sulfur dioxide from ammonium sulfate solutions obtained in the synthesis of organic compounds by combustion, and to improve this process with respect to economy. In particular, the expensive crystallization of the ammonium sulfate in crystallizers prior to combustion is to be eliminated.

Thus, a principal object of this invention is to provide an improved process for the production of $SO_2$-containing gases from aqueous solutions of ammonium sulfate. Upon further study of the specification and appended claims, other objects and advantages of the invention will become apparent.

SUMMARY OF THE INVENTION

To attain the above objects of the invention, there is provided a process comprising the steps of concentrating an aqueous solution of ammonium sulfate and burning resultant concentrate at 850°–1250° C to form a combustion gas containing $SO_2$, the improvement which comprises conduction said concentrating by passing said combustion gas in direct contact with said aqueous solution of ammonium to evaporate water from said solution.

The utilization of the hot gas for the evaporation of the solution and the crystallization of the ammonium sulfate eliminates the crystallizers employed heretofore and requires neither steam nor a vacuum. The water from the ammonium sulfate solution is vaporized into the combustion gas, the gas being cooled at the same time. In the evaporation stage, solid ammonium sulfate is produced from the ammonium sulfate solution; this solid ammonium sulfate can be obtained as a suspension or slurry, which still contains water, or as a solid, substantially anhydrous product e. g., water content below 10% by weight. The slurry or the moist salt can be directly fed to the combustion stage. By an additional cooling of the combustion gas, the water can again be separated therefrom.

In accordance with one embodiment of the invention, the ammonium sulfate solution is evaporated from a water content of 50 to 70% by weight to a water content of 20–45% by weight, and the thus-produced ammonium sulfate slurry is then burned. In correspondence with the water content of the ammonium sulfate slurry, a larger quantity of fuel is consumed during the combustion, as compared to the already suggested combustion of solid ammonium sulfate. The crystalline slurry can be introduced into the combustion furnace through nozzles with the aid of compressed air. It is also possible to finely distribute the slurry in the combustion furnace by introduction onto a rotating disk or in some other manner. In this embodiment, the water content in the incoming solution is usually lowered in the evaporation step by a percentage increment of 5 to 50% by weight.

According to another embodiment of the invention, the ammonium sulfate solution having a water content of 52 to 70% is evaporated until a suspension with 30–50% by weight of water is obtained, the incremented percent of water being decreased by about 2 to 40; the solid ammonium sulfate formed during the evaporation is then separated from the mother liquor and burned, and the mother liquor is recycled into the evaporation stage. Most advantageously, the ammonium sulfate is separated from the mother liquor by centrifuging, but it is also possible to employ rotary filters. The moisture content of the ammonium sulfate separated by centrifuging is generally below 20% by weight, preferably below 10% by weight $H_2O$, so that the minimum specific fuel consumption is obtained in the combustion stage by this mode of operation. The recycling of the mother liquor makes it possible to burn the ammonium sulfate, contained in the solution employed herein, in almost a quantitative manner. The mother liquor is reintroduced into the evaporator separately or together with fresh ammonium sulfate solution.

In accordance with a further and preferred embodiment of this invention, the ammonium sulfate solution is substantially evaporated to dryness by being atomized into the hot stream of combustion gas, and the resultant dry ammonium sulfate is then burned. The degree of evaporation, i. e., whether a suspension, a slurry, or a dry crystallized product is obtained in the evaporation stage, depends on how finely the ammonium sulfate solution is dispersed by the nozzles, the temperature of the combustion gas upon entrance into the evaporator, and the contact time between solution and gas. The dry ammonium sulfate produced in accordance with this method can still contain up to 10% by weight of $H_2O$. A certain, minor moisture content in the ammonium sulfate, i. e., about at least 3%, preferably at least 5% water, prevents ammonia from being split off, which can otherwise readily result. In order to avoid the splitting of ammonia, the temperature of the dried ammonium sulfate is not to exceed 250° C. The solid ammonium sulfate is discharged from the evaporator, for example, with the aid of a screw conveyor and fed to the combustion furnace by means of a suitable conveyor, for example, a conveyor belt or by pneumatic means.

The hot gas, after leaving the combustion stage, can be cooled in at least one heat exchanger, especially a waste heat boiler, and can then brought into contact with the ammonium sulfate solution to be evaporated. Thus, a portion of the heat of combustion can be utilized for preheating the oxygen-containing gas or, in special cases, for steam generation. In this connection, it is preferred that the temperature of the gas, during its contact with the solid ammonium sulfate, i. e., toward the end of the evaporation process, be controlled so as not to rise above 240°–280° C, since the splitting-off of ammonia becomes noticeable above this temperature range. For this purpose, the heat balance can be adjusted accordingly by adjusting the various parameters affecting same, e. g., temperature and quantity of incoming gas, residence time, etc. Generally, it is preferred for this purpose to use an incoming combustion gas having a temperature of 500° to 1100° C.

At a gas temperature above 280° C at the end of the evaporation process, a part of the ammonia passes over into the gaseous phase. Such a contingency can be dealt with by a subsequent scrubbing step with sulfuric acid wherein the ammonia can be removed from the gas. In this case, the ammonium-sulfate-containing scrubbing acid is to be burned additionally to the ammonium sulfate. The splitting-off of ammonia can also be prevented by adding some sulfuric acid to the ammonium sulfate prior to evaporation.

In accordance with a preferred embodiment of the present invention, the hot gas is conducted through the evaporator in parallel (cocurrent) flow with respect to the ammonium sulfate solution to be evaporated. This parallel-flow evaporation takes place in an especially gentle manner, so that the incoming gas temperature can be relatively high, e. g., about 500° to 1100° C without splitting off appreciable amounts of ammonia.

The starting material for the evaporation step is advantageously an aqueous ammonium sulfate solution of a strength of about 32–40% by weight ammonium sulfate, obtained, for example, during the Beckmann rearrangement of cyclohexanone oxime to caprolactam and the subsequent neutralization of the mixture of the rearrangement reaction with ammonia. Moreover, ammonium sulfate solutions from other processes can likewise be utilized, for example, a neutral or optionally weakly acidic ammonium sulfate solution from the manufacture of acrylonitrile, methacrylonitrile, and other nitriles.

The gas leaving the evaporation stage at a temperature of between about 100° and 250° C contains the entire water introduced into the process by the ammonium sulfate solution and produced by the combustion step; accordingly, the gas serves as the carrier medium for the removal of the water from the evaporation stage. Prior to processing the $SO_2$-containing gas to sulfuric acid, the water must be substantially completely removed from the gas. For this purpose, the $SO_2$-containing combustion gas is cooled to 30°–50° C after passing through the evaporation stage. During this step, the major quantity of steam contained in the gas is condensed. The thus-condensed water still contains $SO_2$ however, and in order to remove this latter compound, the condensate can be treated with air in a stripper column. The $SO_2$-laden air is advantageously employed as combustion air for the combustion of the ammonium sulfate.

Since in all cases the combustion gas contains, in addition to $SO_2$, some $SO_3$, several percent of sulfuric acid are formed in the condensed water; this sulfuric acid binds any ammonia split off from the gas. In this way, no ammonia passes into the gas drying tower, and the thus-formed concentrated sulfuric acid remains free of ammonia nitrogen.

Preferably, the provision is made to bring the $SO_2$-containing gas, after it has been used for evaporating the ammonium sulfate solution, into contact with sulfuric acid. This contact with sulfuric acid serves as a precautionary measure for scrubbing out any split-off ammonia from the gaseous stream, and the resultant ammonium sulfate can be recycled to the combustion stage.

In order to keep the formation of nitrogen oxides during the combustion at a minimum, the $O_2$-content of the combustion gas at the discharge end of the combustion furnace is preferably maintained at a value of between 1% and 10% by volume. If minor amounts of nitrogen oxides have been formed and have been dissolved in the thus-produced sulfuric acid with the formation of ntirosylsulfuric acid, the product can be purified by the addition of suitable chemicals, such as hydrazine or amidosulfonic acid. The residence time of the starting material to be burned in the combustion furnace ranges preferably between 0.2 and 20 seconds. Examples for suitable fuels are natural gas; fuel oil, particularly a fuel oil enriched in sulfur; hydrogen sulfide; and sulfur. These fuels can be used individually or in combination. A suitable oxygen-containing gas is air, oxygen-enriched air, or essentially pure oxygen.

DESCRIPTION OF DRAWING

The attached drawing is a schematic representation of a preferred embodiment of this invention, and after the following detailed description thereof, there are provided non-limitative examples for purposes of further illustrating the invention.

Through conduit 4, the ammonium sulfate solution is fed to the head of a spray tower 3; simultaneously, the combustion gas, precooled in the heat exchanger 2, is charged into this tower via conduit 13. In the spray tower 3, the water of the ammonium sulfate solution is evaporated with the deposition of a solid salt; the latter is discharged at the bottom of the tower and is fed, after comminution (not shown), via conduit 9 to the combustion furnace 1. At the same time, fuel oil is charged into the furnace 1 via conduit 10 and air is fed via conduit 11. In the furnace, the ammonium sulfate is completely combusted.

The hot gas passes, via conduit 12, heat exchanger 2, conduit 13, evaporation tower 3, and conduit 5, into the cooling tower 6, wherein the predominant portion of the steam in the gas is condensed by direct contact with cold water. The gas, exhaustively freed of the water, is discharged from the cooling tower 6 via conduit 7 and is available for the production of sulfuric acid. The dilute sulfuric acid passing through the cooling tower 6 is constantly recycled and maintained at a temperature of about 35° C. by means of the direct cooler 8. An amount of dilute sulfuric acid corresponding to the water condensation in tower 6 is withdrawn from the cycle at 14.

The $SO_2$-containing gas produced in accordance with the present invention is processed into sulfuric acid advantageously by means of contact oxidation. The sulfuric acid can again be utilized in the manufacture of organic compounds, for example in the Beckmann rearrangement of cyclohexanone oxime, or in the scrubbing of $NH_3$-containing gases.

EXAMPLE 1

4997 kg./h. of a 37.8% strength ammonium sulfate solution is introduced via nozzles, at a temperature of 50° C., into an evaporation tower wherein 7590 $Nm^3$/h. of precooled combustion gas with a temperature of 690° C. flows downwardly in parallel flow with the solution. The combustion gas consists of 4.1 vol.% $SO_2$; 4.3 vol.% $CO_2$; 3.3 vol.% $O_2$; 32.4 vol.% $H_2O$; and 55.9 vol.% $N_2$. In the sump of the evaporation tower, 2517 kg./h. of an ammonium sulfate slurry is obtained, containing 75% by weight of ammonium sulfate in a solid or dissolved form. 10,820 $Nm^3$/h. of a gas with 2.9 vol.% $SO_2$; 3.0 vol.% $CO_2$; 2.3 vol.% $O_2$; 52.6 vol.% $H_2O$; and 39.2 vol.% $N_2$ is discharged from the evaporation tower at about 110° C. By cooling and subsequent treatment with sulfuric acid, the water is removed from this gas, thus obtaining about 5540 $Nm^3$ of a dry gas with 6.1 vol.% $SO_2$; 6.4 vol.% $CO_2$; 4.9 vol.% $O_2$; and 82.6 vol.% $N_2$.

The 75% strength ammonium sulfate slurry (2517 kg./h.) is combusted at about 1000° C. in a combustion furnace with 210 kg./h. of fuel oil with a net calorific value of about 10,000 kcal./kg. and with 4960 $Nm^3$/h. of air preheated to 500° C. During this step, the above-mentioned 7590 $Nm^3$/h. of combustion gas is obtained which, after an intermediate cooling to 690° C., serve for the evaporation of the ammonium sulfate solution.

EXAMPLE 2

4997 kg./h. of a 37.8% strength ammonium sulfate solution of a temperature of 50° C. is mixed with 4816 kg./h. of a mother liquor containing 51.8% by weight of ammonium sulfate; the mixture is charged through nozzles into an empty tower. In parallel flow with the solution to be evaporated, 6786 $Nm^3$/h. of combustion gas is conducted through the tower. The temperature of the combustion gas at the inlet of the tower is 880° C. This gas consists of 4.6% by weight $SO_2$; 3.3% by weight $O_2$; 62.0% by weight $N_2$; 5.0% by weight $CO_2$; and 25.0% by weight $H_2O$. The thus-introduced solution gives off water to the combustion gas in the tower, so that 6742 kg./h. of an ammonium sulfate suspension is obtained in the sump containing 65% by weight of ammonium sulfate in a solid and dissolved form. Furthermore, 10,786 $Nm^3$/h. of a gas is discharged from the tower containing 2.9% by weight $SO_2$; 2.1% by weight $O_2$; 39.0% by weight $N_2$; 3.2% by weight $CO_2$; and 52.8% by weight $H_2O$. After removal of the water by cooling and scrubbing with sulfuric acid, the result is a gas with 6.15% by weight $SO_2$, which can be processed into sulfuric acid.

The ammonium sulfate suspension is separated, in a centrifuge into 1926 kg./h. of solid ammonium sulfate with 2% by weight $H_2O$ and 4816 kg./h. of a 51.8% by weight ammonium sulfate solution. This ammonium sulfate solution is recycled into the evaporation tower as mentioned above. The solid ammonium sulfate is combusted in a furnace with 218 kg./h. of fuel oil (net calorific value $[H_u] = 10,000$ kcal./kg) and 4918 $Nm^3$/h. of air of a temperature of 20° C., the combustion temperature being approximately 1000° C. During this process, 6786 $Nm^3$/h. of combustion gas is obtained which, after cooling to 880° C., serves for the evaporation of the ammonium sulfate solution.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process comprising the steps of concentrating a neutral aqueous solution of ammonium sulfate obtained in the synthesis of organic compounds and burning resultant concentrate at 850°–1250° C to form a combustion gas containing $SO_2$ and $SO_3$, the improvement which comprises:

conducting said concentrating by passing said combustion gas having a temperature of 500°–1100° C in direct contact with said aqueous solution of ammonium sulfate to evaporate sufficient water from said solution to form solid ammonium sulfate having a moisture content of at least 3% by weight from said solution.

2. A process according to claim 1, wherein said concentrating is conducted so as to evaporate sufficient water to form a resultant concentrate having a water concentration of 30-50% by weight, said concentrate containing solids and a mother liquor, and comprising the further steps of separating said solids; burning said solids; and recycling said mother liquor to said concentrating step.

3. A process according to claim 1, wherein said ammonium sulfate solution is sprayed into the combustion gas to form substantially dry ammonium sulfate having a water concentration of up to 10% by weight.

4. A process according to claim 1, wherein said combustion gas and the ammonium sulfate solution to be concentrated are directly contacted in a cocurrent manner.

5. A process according to claim 1, said ammonium sulfate solution to be concentrated being 32–40% by weight ammonium sulfate.

6. A process according to claim 1, said ammonium sulfate being processed to particulate form prior to the burning step.

7. A process according to claim 1, further comprising the subsequent step of cooling the $SO_2$-containing combustion gas to 30°–50° C after said gas is contacted with the aqueous solution of ammonium sulfate.

8. A process according to claim 1, further comprising the subsequent step of contacting the $SO_2$-containing combustion gas with sulfuric acid after said gas is contacted with the aqueous solution of ammonium sulfate.

* * * * *